United States Patent
Martin et al.

(10) Patent No.: US 10,523,780 B2
(45) Date of Patent: Dec. 31, 2019

(54) DETERMINING A PRIMARY USER OF A CLIENT DEVICE AND PROPAGATING SETTINGS OF THE PRIMARY USER FROM THE CLIENT DEVICE TO AN ONLINE SYSTEM

(71) Applicant: Facebook, Inc., Menlo Park, CA (US)

(72) Inventors: David Townsend Martin, San Francisco, CA (US); Gianluca Iannaccone, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 526 days.

(21) Appl. No.: 15/299,296

(22) Filed: Oct. 20, 2016

(65) Prior Publication Data
US 2018/0115631 A1 Apr. 26, 2018

(51) Int. Cl.
*G06F 15/16* (2006.01)
*H04L 29/08* (2006.01)
*H04L 29/06* (2006.01)

(52) U.S. Cl.
CPC .......... *H04L 67/306* (2013.01); *H04L 63/083* (2013.01); *H04L 67/22* (2013.01)

(58) Field of Classification Search
CPC ........ H04L 67/306; H04L 67/22; H04L 29/06
USPC .................................. 709/203, 224; 726/18
See application file for complete search history.

(56) References Cited

U.S. PATENT DOCUMENTS

| | | | | |
|---|---|---|---|---|
| 8,875,267 B1 * | 10/2014 | Kolman | .................. | G06F 21/31 726/7 |
| 9,148,424 B1 * | 9/2015 | Yang | .................. | H04L 63/1416 |
| 2014/0032565 A1 * | 1/2014 | Parker | ................. | G06F 16/4393 707/741 |

* cited by examiner

*Primary Examiner* — David R Lazaro
*Assistant Examiner* — Mariegeorges A Henry
(74) *Attorney, Agent, or Firm* — Fenwick & West LLP

(57) ABSTRACT

An online system propagates settings from a user's client device to the online system itself for the user. If multiple users of the online system use the client device, the online system propagates settings of a primary user of the client device to the online system, but does not propagate settings of other users of the client device to the online system. The online system logs accesses to the online system each day from the client device of each user. A user having a maximum number of logged days accessing the system and accessing the online system for at least 50% of the logged days is determined to be the primary user by the online system. The online system may use determination that a user is a primary user of the client device for associating actions with the user, selecting content for the user, and identifying the user.

18 Claims, 3 Drawing Sheets

DETERMINING A PRIMARY USER OF A CLIENT DEVICE AND PROPAGATING SETTINGS OF THE PRIMARY USER FROM THE CLIENT DEVICE TO AN ONLINE SYSTEM

BACKGROUND

This disclosure relates generally to presenting maintaining information describing users of an online system, and more specifically to determining whether to maintain information obtained from a client device in association with an online system user.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users. Content provided to an online system by a user may be declarative information provided by a user, status updates, check-ins to locations, images, photographs, videos, text data, or any other information a user wishes to share with additional users of the online system. An online system may also generate content for presentation to a user, such as content describing actions taken by other users on the online system.

Users frequently access content provided by an online system using one or more client devices. For example, a client device executes an application associated with the online system that provides content from the online system to a user of the client device. To improve user interaction with the online system, the online system allows a user of the client device to specify one or more settings of the application associated with the online system to personalize how the application provides content via the client device or to personalize information the application communicates to the online system from the client device. This allows a user of a client device to customize presentation of content from the online system when the user accesses the content from the client device.

However, multiple online system users may access content provided by the online system from a single client device. For example, multiple users have separate accounts on a tablet computer, and each user accesses content from the online system via the application associated with the online system executing on the tablet computer after logging into the tablet computer. Each user of the client device may maintain separate settings for the application associated with the online system to personalize how the application associated with the online system presents content to different users accessing content from the online system via the tablet computer. Settings for the application associated with the online system are locally stored on a client device, so the settings may be retrieved when different users login to the client device.

While locally storing settings for the application associated with the online system allows content presented from the online system to be personalized when presented to a user via the client device. However, if a user accesses content from the online system using another client device, the settings specified by the user and stored on the client device are not used when the content is presented. This may cause differences between content presented to the user by the client device and by another client device. However, when different users access content from the online system via a single client device, if the online system retrieves settings for the application associated with the online system stored on the client device, the retrieved settings may not apply to various users of the online system, so if the online system users the retrieved settings when presenting content to certain users via other client devices, the content may be presented in a manner that reduces a likelihood of the certain users interacting with the content

SUMMARY

Various users of an online system provide information to the online system or obtain content from the online system using client devices. For example, an application associated with the online system is installed on a client device and the application subsequently executes on the client device. The online system provides content to the application, and a user of the client device is presented with the content by executing or by interacting with the application via the client device. Similarly, the application may obtain information from the client device (e.g., a location of the client device, content accessed via the client device) and communicate the information to the online system along with information identifying a user of the client device, allowing the online system to store the obtained information in association with the user.

However, multiple users of the online system may use a single client device to access content provided by the online system. For example, multiple users of the online system maintain separate accounts on a mobile device (e.g., a tablet, a smartphone), and a user who logs into the mobile device accesses content from the online system via the application associated with the online system executing on the mobile device. To provide content to the mobile device relevant to the user who logged into the mobile device, the application communicates information identifying the user who logged into the mobile device to the online system, which identifies the user and provides content selected for the identified user to the mobile device for presentation. For example, when the user logs into the mobile device, the application transmits a login request including information identifying the mobile device, a time when the login request was generated or transmitted, and information identifying the mobile device. After identifying the user from the login request, if the online system receives information from the application executing on the mobile device, the online system associates the received information with the identified user.

Different users of a client device may maintain different settings for the application associated with the online system and executing on the client device. For example, a user of client device prevents the application from communicating information describing content presented to the user via the client device to the online system. Thus, when a user logs into the client device, the application retrieves one or more settings associated with that user for use when presenting content via the client device. In some embodiments, after logging into the client device, a user modifies one or more settings or the application to alter how the application subsequently provides content from the online system to the user. To improve user interaction, the online system may store one or more settings of the application executing on the client device in association with a user, allowing the online system to use those settings when the user accesses the online system from a different client device. For example, if a user specifies a setting for the application to prevent the application from transmitting information describing content accessed by the user via the client device, the online system obtains the setting from the client device and locally stores the setting, so information describing content accessed by the user from other client devices is not communicated to the online system when the user is using another client device executing the application associated with the online system.

However, when multiple users access the online system from a particular client device, a user may specify a setting for the application associated with the online system to regulate functionality of the application associated with the online system executing on the particular client device. In such a scenario, having the online system obtain and store one or more settings of the application for a user impairs subsequent presentation of content by the online system to the user when accessing the online system from a different client device. To determine when to retrieve settings, or other information, from a client device from which the online system is accessed, the online system identifies a primary user of the client device and retrieves information, such as settings, stored by the primary user on the client device for association with the primary user by the online system, but does not retrieve information stored by other users on the client device.

To identify a primary user of a client device, the online system receives login requests from the client device. Each login request includes information identifying the client device 110, information identifying a user of the online system associated with the login request, and a time associated with the login request. For example, a login request includes a device identifier of the client device, a user identifier associated with the user requesting to log into the online system by the online system, as well as a date and a time when the login request was generated (or was transmitted). In various embodiments, a login request may include additional information as well. Additionally, a login request may be received by the online system from the client device or may be received by the online system from a third party system that exchanges information with the online system.

The online system stores information specifying the time associated with each login request and the information identifying the user of the online system associated with each login request in association with the information identifying the client device. For example, the online system stores a user identifier associated with a user by the online system from a login request and a date and a time associated with the login request in association with a device identifier from the login request. In some embodiments, the online system stores login requests received during a particular time interval or received login requests including a date and a time within the particular time interval. For example, the online system stores login requests received from the client device and including a date and a time within a month of a current time.

Based on the information from the login requests stored in association with information describing the client device, the online system determines a primary user of the client device. In various embodiments, the online system determines the primary user of the client device as a user identified by at least a threshold number of login requests received during a time interval that include information identifying the client device. For example, the online system determines the primary user of the client device as a user corresponding to user identifying information included in at least a threshold amount of login requests received during the time interval that include a device identifier corresponding to the client device.

The online system may use any suitable criteria to determine the primary user of the client device from the stored information describing login requests received from the client device. For example, the online system determines the primary user of the client device as a user identified by greater than fifty percent of the login requests received from the client device during the time interval. As another example, the online system determines the primary user of the client device as a user identified by a maximum number of the login requests received from the client device during the time interval. In another example, the online system determines the primary user of the client device as a user identified by the maximum number of the login requests received from the client device during the time interval and identified by greater than fifty percent of the login requests received from the client device during the time interval. If the online system is unable to identify a user of the client device who is identified by at least a threshold number of login requests received during a time interval including information identifying the client device, the online system determines there is no primary user of the client device.

However, in response to determining the primary user of the client device, the online system retrieves information from the client device that is associated with the primary user and stores the information retrieved from the client device in association with the primary user. For example, the online system retrieves one or more settings of the application associated with the online system and executing on the client device and stores the retrieved settings in a user profile maintained for the primary user of the client device on the online system. Storing the retrieved information in association with the primary user allows the online system to use the stored information when presenting content to the primary user via another client device.

For example, the online system retrieves one or more settings maintained by the application associated with the online system and associated with the primary user of the client device; the online system stores one or more of the retrieved settings associated with the primary user in a user profile associated with the primary user of the client device. A setting retrieved from the client device may specify information that the application communicates to the online system; for example, the setting prevents the application associated with the online system from identifying content the primary user associated with accesses via the client device using other applications executing on the client device or authorizes the application associated with the online system to identify content accessed by the primary user via one or more other applications executing on the client device. As the online system may select content for presentation to users based on content presented to the user via applications other than the application associated with the online system executing on the client device, whether a particular user is the primary user of the client device or is another user affects content selected by the online system for the user. The online system may also use the one or more settings retrieved from the client device and stored in association with the primary user when determining whether to associate information received from the client device describing an interaction performed via the client device 110 with the primary user. Additionally, the online system may account for determining the primary user of the client device when determining whether an online system user identified to the online system by a third party system is a particular user of the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
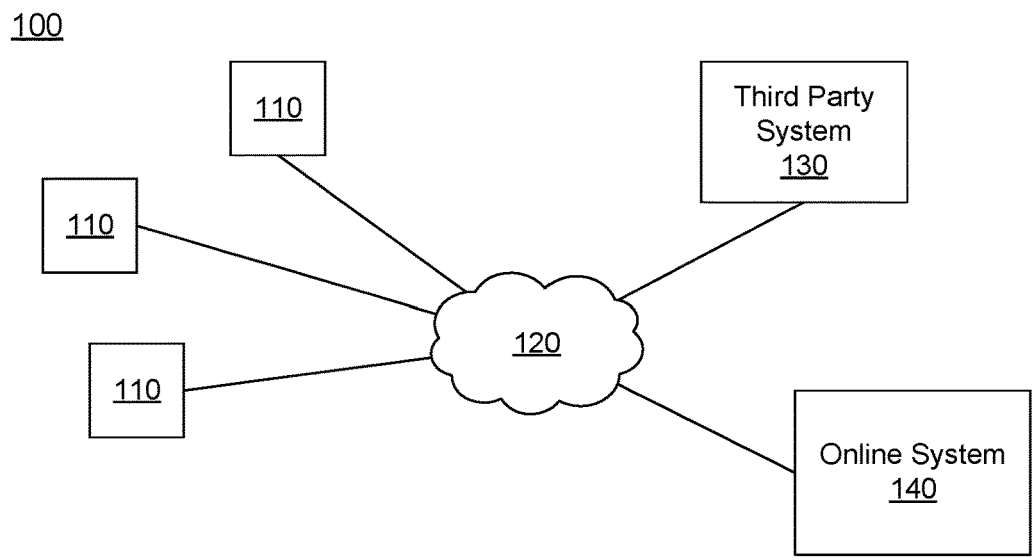
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 provide content to users of the online system 140. For example, a third party system 130 maintains pages of content that users of the online system 140 may access through one or more applications executing on a client device 110. The third party system 130 may provide content items to the online system 140 identifying content provided by the online system 130 to notify users of the online system 140 of the content provided by the third party system 130. For example, a content item provided by the third party system 130 to the online system 140 identifies a page of content provided by the online system 140 that specifies a network address for obtaining the page of content.

Figure 2:
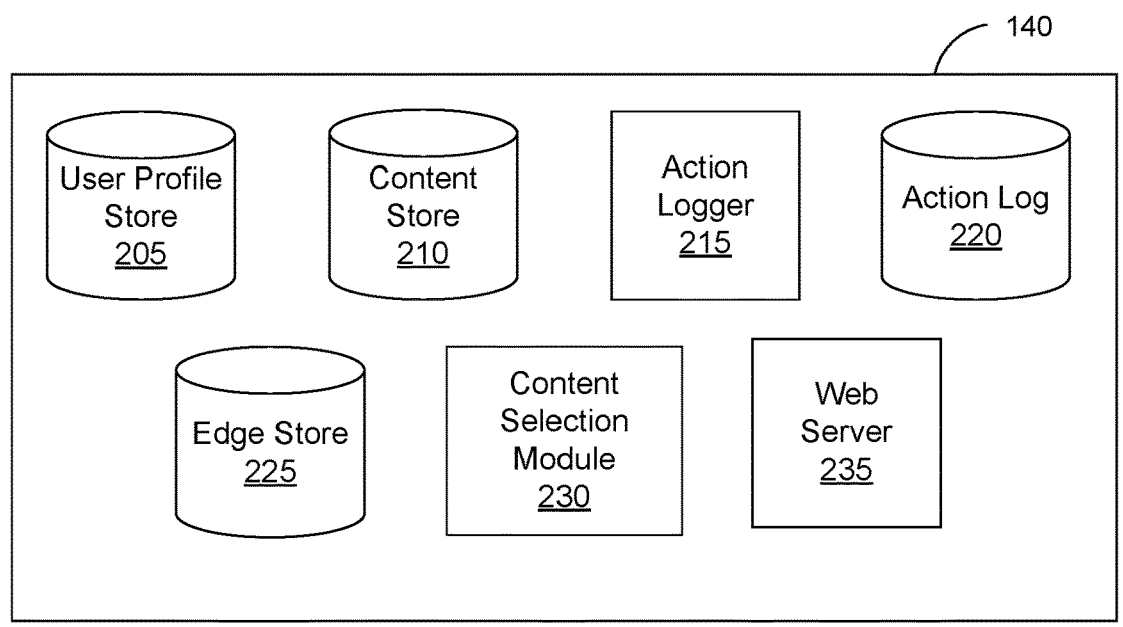
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile includes user identifying information allowing the online system 140 to uniquely identify users corresponding to different user profiles. For example, each user profile includes an electronic mail ("email") address, allowing the online system 140 to identify different users based on their email addresses. However, a user profile may include any suitable user identifying information associated with users by the online system 140 that allows the online system 140 to identify different users.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the ad request's bid amount and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

In various embodiments, the content selection module 230 also determines a primary user of a client device 110 from which multiple users access the online system 140. For example, multiple users of the online system 140 access content provided by the online system from a single client device 110. As an example, multiple users of the online system 140 access content provided by the online system 140 via an application associated with the online system 140 and executing on the client device 110. However, when multiple users access the online system 140 from a single client device 110, different users may specify different settings for the application associated with the online system 140 to regulate functionality of the application associated with the online system executing on the particular client device. While specifying settings for the application that are stored by the single client device 110 affects functionality of the application on the single client device 110, functionality of the application executing on other client devices 110 is unaffected, causing different operation of the application when the user accesses the online system 140 using different client devices. To improve interaction with content provided by the online system 140 from various client devices 110, the content selection module 230 retrieves and stores one or more settings of the application executing on the single client device 110 for a user, allowing the online system 140 to subsequently apply the stored settings when the user accesses the online system 140 from an application executing on another client device 110. However, to improve user engagement with content provided by the online system 140, the content selection module 230 identifies a primary user of the single client device 110 and retrieves information, such as settings, stored by the primary user on the single client device 110 for association with the primary user by the online system 140, but does not retrieve information stored by other users of the single client device 110.

To identify the primary user of the single client device 110, the content selection module 230 stores information included in login requests received from the single client device 110. For example, the online system 140 receives a login request from the single client device 110 each time a user of the single client device 110 logs into the online system 140 from the single client device 110 or each time a user of the single client device 110 initially executes an application associated with the online system 140 and executing on the single client device 110. A login request includes information identifying a user of the single client device 110, an identifier of the single client device 110, and a date and a time associated with the login request. From the stored information, the content selection module 230 identifies a primary user of the single client device as a user identified with received login requests and satisfying one or more criteria. For example, the content selection module 230 identifies the primary user of the single client device 110 as a user identified by a maximum number of the login requests received from the single client device 110 and associated with at least 50% of dates identified by the information stored from the received login requests. Determination of the primary user of the single client device 110 is further described below in conjunction with FIG. 3. The content selection module 230 retrieves one or more settings of the application executing on the single client device 110 and associated with the primary user from the single client device 110 and stores the retrieved one or more settings in a user profile maintained by the online system 140 for the primary user. Additionally, the content selection module 230 may use an indication that a user is the primary user of the single client device 110 when selecting content for the primary user. The online system 140 may also use the indication that the user is the primary user of the single client device 110 when determining whether to associate actions with the user or when determining if the user is identified by a third party system.

The web server 235 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
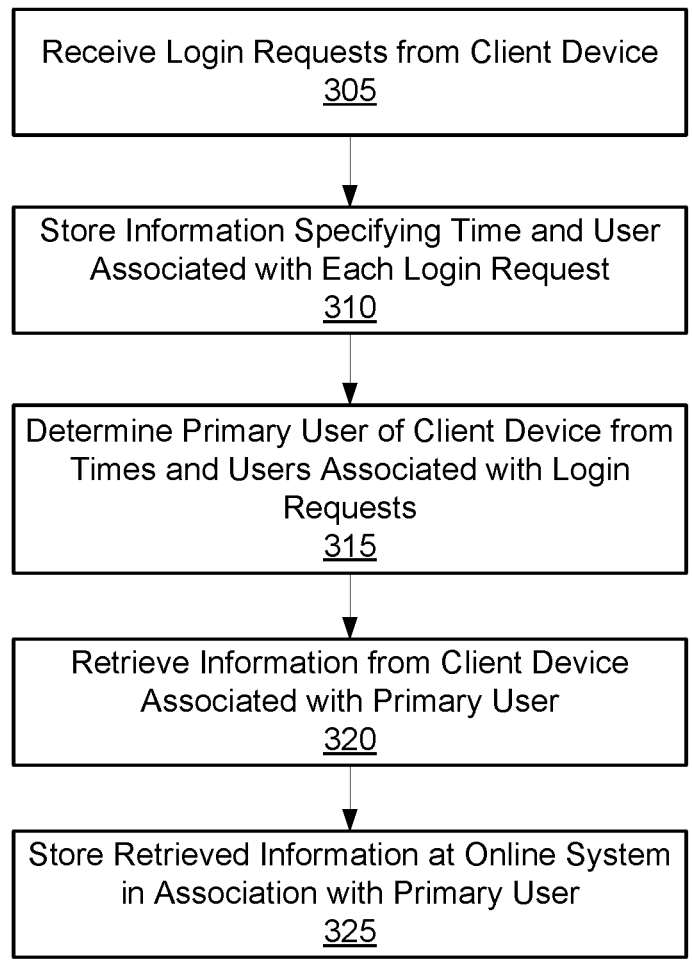
FIG. 3 is a flowchart of a method for obtaining information from a client device for association with a user in response to determining the user is a primary user of the client device, in accordance with an embodiment.

Determining Whether to Obtain Information from a Client Device for Association with a User FIG. 3 is a flowchart of one embodiment of a method for obtaining information from a client device 110 for association with a user in response to determining the user is a primary user of the client device 110. In other embodiments, the method may include different and/or additional steps than those shown in FIG. 3. Additionally, steps of the method may be performed in different orders than the order described in conjunction with FIG. 3 in various embodiments.

Various users of an online system 140 provide information to the online system 140 or obtain content from the online system 140 using client devices 110. For example, an application associated with the online system 140 is installed on a client device 110 and the application subsequently executes on the client device 110. The online system 110 provides content to the application, and a user of the client device 110 is presented with the content by executing or by interacting with the application via the client device 110. Similarly, the application may obtain information from the client device 110 (e.g., a location of the client device 110, content accessed via the client device 110) and communicate the information to the online system 140 along with information identifying a user of the client device 110, allowing the online system 140 to store the obtained information in association with the user.

However, multiple users of the online system 140 may use a single client device 110 to access content provided by the online system 140. For example, multiple users of the online system 140 maintain separate accounts on a mobile device (e.g., a tablet, a smartphone), and a user who logs into the mobile device accesses content from the online system 140 via the application associated with the online system 140 executing on the mobile device. To provide content to the mobile device relevant to the user who logged into the mobile device, the application communicates information identifying the user who logged into the mobile device to the online system 140, which identifies the user and provides content selected for the identified user to the mobile device for presentation. For example, when the user logs into the mobile device, the application transmits a login request including information identifying the mobile device (or client device 110), a time when the login request was generated or transmitted, and information identifying the mobile device (or client device 110). After identifying the user from the login request, if the online system 140 receives information from the application executing on the mobile device, the online system 140 associates the received information with the identified user.

Different users of a client device 110 may maintain different settings for the application associated with the online system 140 and executing on the client device 110. For example, a user of client device 110 prevents the application from communicating information describing content presented to the user via the client device 110 to the online system 140. Thus, when a user logs into the client device 110, the application retrieves one or more settings associated with that user for use when presenting content via the client device 110. In some embodiments, after logging into the client device 110, a user modifies one or more settings or the application to alter how the application subsequently provides content from the online system 140 to the user. To improve user interaction with the online system 140, the online system 140 may store one or more settings of the application executing on the client device 110 in association with a user, allowing the online system 140 to use those settings when the user accesses the online system 140 from a different client device 110. For example, if a user specifies a setting for the application to prevent the application from transmitting information describing content accessed by the user via the client device 110, the online system 140 obtains the setting from the client device 110 and locally stores the setting, so information describing content accessed by the user from other client devices 110 is not communicated to the online system 140 when the user is using another client device 110 executing the application associated with the online system 140.

However, when multiple users access the online system 140 from a particular client device 110, a user may specify a setting for the application associated with the online system 140 to regulate functionality of the application associated with the online system 140 executing on the particular client device 110. In such a scenario, having the online system 140 obtain and store one or more settings of the application for a user impairs subsequent presentation of content by the online system 140 to the user when accessing the online system 140 from a different client device 110. To determine when to retrieve settings, or other information, from a client device 110 from which the online system 140 is accessed, the online system 140 identifies a primary user of the client device 110 and retrieves information, such as settings, stored by the primary user on the client device 110 for association with the primary user by the online system 140, but does not retrieve information stored by other users on the client device 110.

To identify a primary user of a client device 110, the online system 140 receives 305 login requests from the client device 110. Each login request includes information identifying the client device 110, information identifying a user of the online system 140 associated with the login request, and a time associated with the login request. For example, a login request includes a device identifier of the client device 110, a user identifier associated with the user requesting to log into the online system 140 by the online system 140, as well as a date and a time when the login request was generated (or was transmitted). In various embodiments, a login request may include additional information as well. Additionally, a login request may be received 305 by the online system 140 from the client device 110 or may be received 305 by the online system 140 from a third party system 130 that exchanges information with the online system 140. For example, the client device 110 transmits a login request to a third party system 130 that exchanges information with the online system 140, and the third party system 130 communicates information from the login request identifying the client device 110, identifying the user of the online system 140, and the date and time associated with the login request to the online system 140.

The online system 140 stores 310 information specifying the time associated with each login request and the information identifying the user of the online system 140 associated with each login request in association with the information identifying the client device 110. For example, the online system 140 stores a user identifier associated with a user by the online system 140 from a login request and a date and a time associated with the login request in association with a device identifier from the login request. This allows the online system 140 to maintain information identifying users identified by login requests received 305 from the client device 110 and users identified by the login requests received 305 from the client device 110 in association with the client device 110. In some embodiments, the online system 140 stores 310 login requests received 305 during a particular time interval or received login requests including a date and a time within the particular time interval. For example, the online system 140 stores 310 login requests received from the client device 110 and including a date and a time within a month of a current time.

Based on the information from the login requests stored 310 in association with information describing the client device, the online system 140 determines 315 a primary user of the client device 110. In various embodiments, the online system 140 determines 315 the primary user of the client device 110 as a user identified by at least a threshold number of login requests received during a time interval that include information identifying the client device. For example, the online system 140 determines 315 the primary user of the client device 110 as a user corresponding to user identifying information included in at least a threshold amount of login requests received during the time interval that include a device identifier corresponding to the client device 110.

In various embodiments, the online system 140 uses different criteria to determine 315 the primary user of the client device 110 from the stored information describing login requests received 305 from the client device 110. For example, the online system 140 determines 315 the primary user of the client device 110 as a user identified by greater than fifty percent of the login requests received 305 from the client device 110 during the time interval. As another example, the online system 140 determines 315 the primary user of the client device 110 as a user identified by a maximum number of the login requests received 305 from the client device 110 during the time interval. In another example, the online system 140 determines 315 the primary user of the client device 110 as a user identified by the maximum number of the login requests received 305 from the client device 110 during the time interval and identified by greater than fifty percent of the login requests received 305 from the client device 110 during the time interval. However, the online system 140 may use any suitable criteria to determine 315 the primary user of the client device 110 in various embodiments.

In response to determining 315 the primary user of the client device 110, the online system 140 retrieves 320 information from the client device 310 that is associated with the primary user and stores 325 the information retrieved 320 from the client device in association with the primary user. For example, the online system 140 retrieves 320 one or more settings of the application associated with the online system 140 and executing on the client device 110 and stores 325 the retrieved settings in a user profile maintained for the primary user of the client device 110 on the online system 140. By storing 325 the retrieved information in association with the primary user, the online system 140 may subsequently use the stored information when presenting content to the primary user via another client device 110. For example, the online system 140 retrieves 320 one or more settings maintained by the application associated with the online system 140 and associated with the primary user of the client device 110; the online system 140 stores 325 one or more of the retrieved settings associated with the primary user in a user profile associated with the primary user of the client device 110. A setting retrieved 320 from the client device 110 may specify information that the application communicates to the online system 140; for example, the setting prevents the application associated with the online system 140 from identifying content the primary user associated with accesses via the client device 110 using other applications executing on the client device 110 or authorizes the application associated with the online system 140 to identify content accessed by the primary user via one or more other applications executing on the client device 110. As the online system 140 may select content for presentation to users based on content presented to the user via applications other than the application associated with the online system 140 executing on the client device 110, whether a particular user is the primary user of the client device 110 or is another user affects content selected by the online system 140 for the user. Settings, or other information, retrieved 320 from the client device 110 and stored 325 in association with the primary user are accordingly used by the online system 140 when selecting content for subsequent presentation to the primary user of the client device 110.

In some embodiments, when the online system 140 receives 305 various login requests from the client device 110 identifying different users but is unable to determine 315 a primary user of the client device 110, the online system 140 stores an indication that the client device 110 is a shared device in association with an identifier of the client device 110. Subsequently, the online system 140 may differently associate information received from the client device 110 indicated as being a shared device with online system users identified by the received information. For example, if no user is identified by greater than fifty percent of the login requests received 305 from the client device 110 during the time interval, the online system 140 stores information indicating the client device 110 is a shared device. Hence, the client device 110 may be identified as a shared device if no user identified by login requests received 305 from the client device 110 satisfy criteria used by the online system 140 to determine 315 the primary user of the client device 110. Subsequently, if a request to modify one or more settings maintained by the online system 140 for a user is received and the online system 140 determines the request was received from the client device 110, the online system 140 does not update the one or more settings of the user. Similarly, the online system 140 may determine whether information describing user interactions was received from a client device 110 identified as a shared device by information maintained by the online system 140, and attenuate weights associated with those interactions when subsequently selecting content in response to determining the information was received from a client device 110 identified as a shared device.

The online system 140 may use the one or more settings retrieved 320 from the client device 110 and stored 325 in association with the primary user when determining whether to associate information received from the client device 110 describing an interaction performed via the client device 110 with the primary user. In various embodiments, the online system 140 increases a likelihood of associating information from the client device 110 describing an interaction performed via the client device 110 if the information from the client device 110 identifies the primary user of the client device 110. Conversely, if the information from the client device 110 describing the interaction identifies a user other than the primary user of the client device 110, the online system 140 reduces the likelihood of the online system 140 associating the information with the user other than the primary user of the client device 110.

Additionally, the online system 140 may account for determining the primary user of the client device 110 when determining whether a user identified to the online system 140 by a third party system 130 is the primary user. In some embodiments, the online system 140 increases a likelihood of correlating information from the third party system 130 identifying a user with the primary user when information from the third party system 130 matches information maintained by the online system 140 and associated with a user of the online system 140 if the online system 140 determined 315 the user of the online system 140 is the primary user of the client device 110. Hence, the online system 140 is more likely to determine a user identified by a third party system corresponds to a user of the online system 140 who the online system 140 determined 315 was a primary user of a client device 110.

However, if the online system 140 is unable to determine 315 a primary user of the client device 110 from the users of the client device 110, the online system 140 does not retrieve 320 and store 325 information from the client device 110 in association with the primary user. Thus, if the online system 140 is unable to identify a user of the client device 110 who is identified by at least a threshold number of login requests received during a time interval including information identifying the client device 110, the online system 140 determines there is no primary user of the client device 110. If no primary user is determined 315, information stored on the client device 110 associated with various users remains locally stored on the client device 110 and is used when the users login to the online system 140 from the client device 110, but information stored on the client device 110 in association with a user is not retrieved 320 and stored 325 by the online system 140 for subsequent use when the user accesses the online system 140 from another client device. For example, the online system 140 determines there is no primary user of the client device 110 if no user corresponds to user identifying information included in at least a threshold amount of login requests received during the time interval that include a device identifier corresponding to the client device 110.

Figure 4:
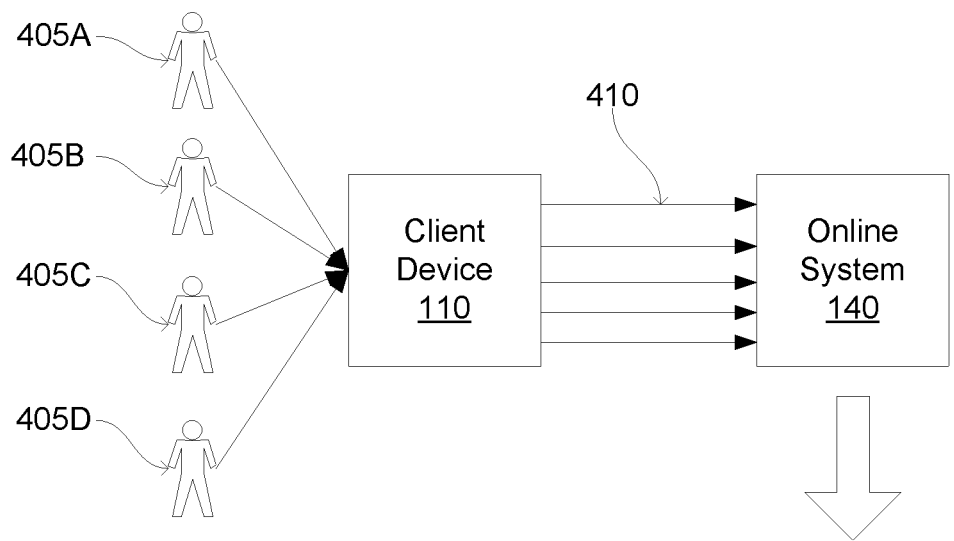
FIG. 4 is a conceptual diagram of determining whether an online system user is a primary user of a client device, in accordance with an embodiment.

FIG. 4 is a conceptual diagram of an example of determining whether an online system user is a primary user of a client device 110. In the example of FIG. 4, multiple users 405A, 405B, 405C, 405D access content from the online system 140 via a client device 110 through an application associated with the online system 140 executing on the client device 110. When a user 405A, 405B, 405C, 405D initially accesses the application associated with the online system 140 and executing on the client device 110, a login request 410 is communicated from the client device 110 to the online system 140. As described above in conjunction with FIG. 3, the online system 140 stores information 415 from the received login requests 410 that identifies a user associated with each login request 410 and a date associated with each login request 410 (e.g., a date when each login request 410 was received or a date when each login request 410 was generated). From the stored information 415, the online system 140 determines a primary user of the client device 110. In the example of FIG. 4, based on the stored information 415, the online system 140 determines the primary user of the client device 110 as a user associated with a maximum number of login requests 410 and associated with greater than 50% of the dates identified by the login requests 410. Hence, in the example of FIG. 4, the online system 140 determines that user 405A is the primary user of the client device 110. As further described above in conjunction with FIG. 3, the online system 140 retrieves information associated with the primary user and stored by the client device 110 and stores the retrieved information is association with the primary user at the online system 140.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving login requests associated with a client device at an online system, each login request identifying the client device, identifying a user of the online system accessing the online system via the client device, and identifying a time associated with the login request;
storing information specifying the time associated with each login request received during a time interval that identifies the client device and identifies the user of the online system identified by each login request received during the time interval that identifies the client device at the online system in association with information identifying the client device;
determining a primary user of the client device as a user who accessed content from the online system via the client device and who was identified by at least a threshold amount of the login requests received during the time interval that identify the client device and that identify users of the online system from the stored information;
determining the primary user of the client device as a user identified by at least fifty percent of the login requests received during the time interval that identify the client device and identified by a maximum number of the login requests received during the time interval that identify the client device based on the stored information;
retrieving information from the client device that is associated with the determined primary user of the client device; and
storing the information retrieved from the client device that is associated with the determined primary user of the client device at the online system in association with the determined primary user of the client device.

2. The method of claim 1, wherein determining the primary user of the client device as the user identified by at least the threshold amount of the login requests received during the time interval that identify the client device based on the stored information comprises:
determining the primary user of the client device as a user identified by greater than fifty percent of the login requests received during the time interval that identify the client device based on the stored information.

3. The method of claim 1, wherein determining the primary user of the client device as the user identified by at least the threshold amount of the login requests received during the time interval that identify the client device based on the stored information comprises:
determining the primary user of the client device as a user identified by at a maximum number of login requests received during the time interval that identify the client device based on the stored information.

4. The method of claim 1, wherein retrieving information from the client device that is associated with the determined primary user of the client device comprises:
retrieving settings associated with the determined primary user of the client device stored by an application associated with the online system and executing on the client device.

5. The method of claim 4, wherein a setting associated with the determined primary user of the client device stored by an application associated with the online system and executing on the client device comprises a setting specifying information communicated from the application to the online system.

6. The method of claim 1, further comprising:
determining whether to associate information received from the client device describing an interaction performed by the user based in part on whether the user is the determined primary user of the client device.

7. The method of claim 1, further comprising:
determining content for presentation by the online system based in part on the determining the primary user of the client device.

8. The method of claim 1, further comprising:
receiving information from a third party system identifying an online system user;
in response to determining that the information received from the third party system matches at least a threshold amount of information associated with the determined primary user of the client device increasing a likelihood that the received information from the third party system correlates to the online system user identified by the information received from the third party system.

9. The method of claim 1, wherein receiving login requests associated with the client device at the online system comprises:
receiving the login requests from the client device.

10. A computer program product comprising a non-transitory computer readable storage medium having instructions encoded thereon that, when executed by a processor, cause the processor to:
receive login requests associated with a client device at an online system, each login request identifying the client device, identifying a user of the online system accessing the online system via the client device, and identifying a time associated with the login request;
store information specifying the time associated with each login request received during a time interval that identifies the client device and identifies the user of the online system identified by each login request received during the time interval that identifies the client device at the online system in association with information identifying the client device;
determine a primary user of the client device as a user who accessed the online system via the client device and who was identified by at least a threshold amount of the login requests received during the time interval that identify the client device and that identify users of the online system from the stored information;
determine the primary user of the client device as a user identified by at least fifty percent of the login requests received during the time interval that identify the client device and identified by a maximum number of the login requests received during the time interval that identify the client device based on the stored information;
retrieve information from the client device that is associated with the determined primary user of the client device; and
store the information retrieved from the client device that is associated with the determined primary user of the client device at the online system in association with the determined primary user of the client device.

11. The computer program product of claim 10, wherein determine the primary user of the client device as the user identified by at least the threshold amount of the login requests received during the time interval that identify the client device based on the stored information comprises:
determine the primary user of the client device as a user identified by greater than fifty percent of the login requests received during the time interval that identify the client device based on the stored information.

12. The computer program product of claim 10, wherein the primary user of the client device as the user identified by at least the threshold amount of the login requests received during the time interval that identify the client device based on the stored information comprises:
    determine the primary user of the client device as a user identified by at a maximum number of login requests received during the time interval that identify the client device based on the stored information.

13. The computer program product of claim 10, wherein retrieve information from the client device that is associated with the determined primary user of the client device comprises:
    retrieve settings associated with the determined primary user of the client device stored by an application associated with the online system and executing on the client device.

14. The computer program product of claim 13, wherein a setting associated with the determined primary user of the client device stored by an application associated with the online system and executing on the client device comprises a setting specifying information communicated from the application to the online system.

15. The computer program product of claim 10, wherein the non-transitory computer readable storage medium further has instructions encoded thereon that, when executed by the processor, cause the processor to:
    determine whether to associate information received from the client device describing an interaction performed by the user based in part on whether the user is the determined primary user of the client device.

16. The computer program product of claim 10, wherein the non-transitory computer readable storage medium further has instructions encoded thereon that, when executed by the processor, cause the processor to:
    determine content for presentation by the online system based in part on the determining the primary user of the client device.

17. The computer program product of claim 10, wherein the non-transitory computer readable storage medium further has instructions encoded thereon that, when executed by the processor, cause the processor to:
    receive information from a third party system identifying an online system user;
    in response to determining the information received from the third party system matches at least a threshold amount of information associated with the determined primary user of the client device, increase a likelihood that the received information from the third party system correlates to the online system user identified by the information received from the third party system.

18. The computer program product of claim 10, wherein receive login requests associated with the client device at the online system comprises: receive the login requests from the client device.

* * * * *